May 12, 1942.  J. H. WIGGINS  2,282,771
APPARATUS FOR GAUGING LIQUID CONTAINERS
Filed Nov. 28, 1938  3 Sheets-Sheet 1
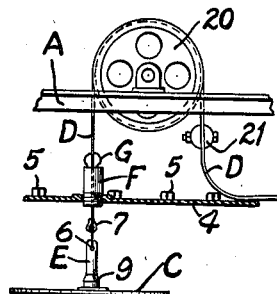
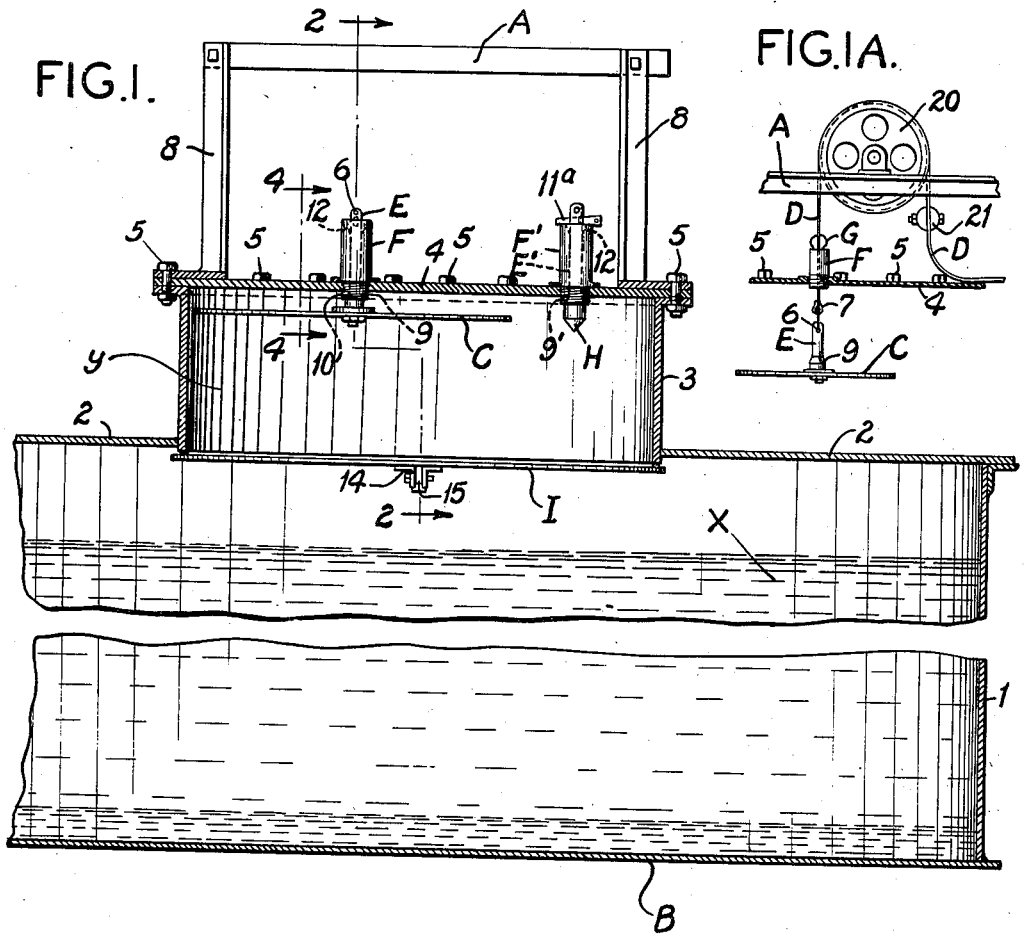
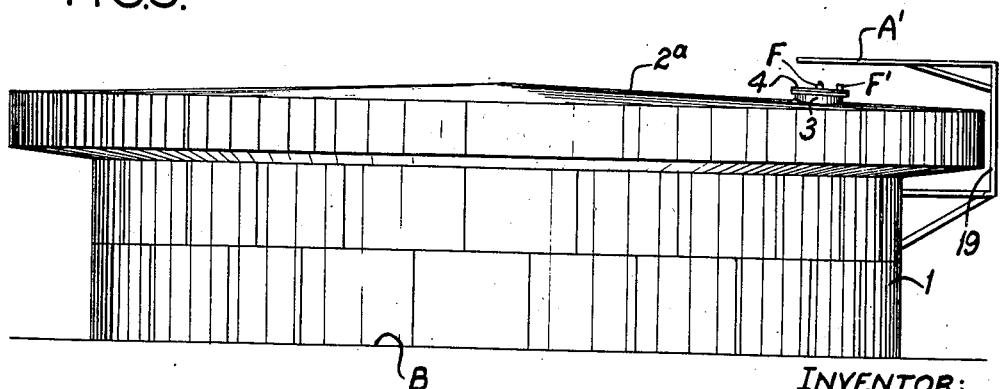
INVENTOR:
JOHN H. WIGGINS
BY
ATTORNEY

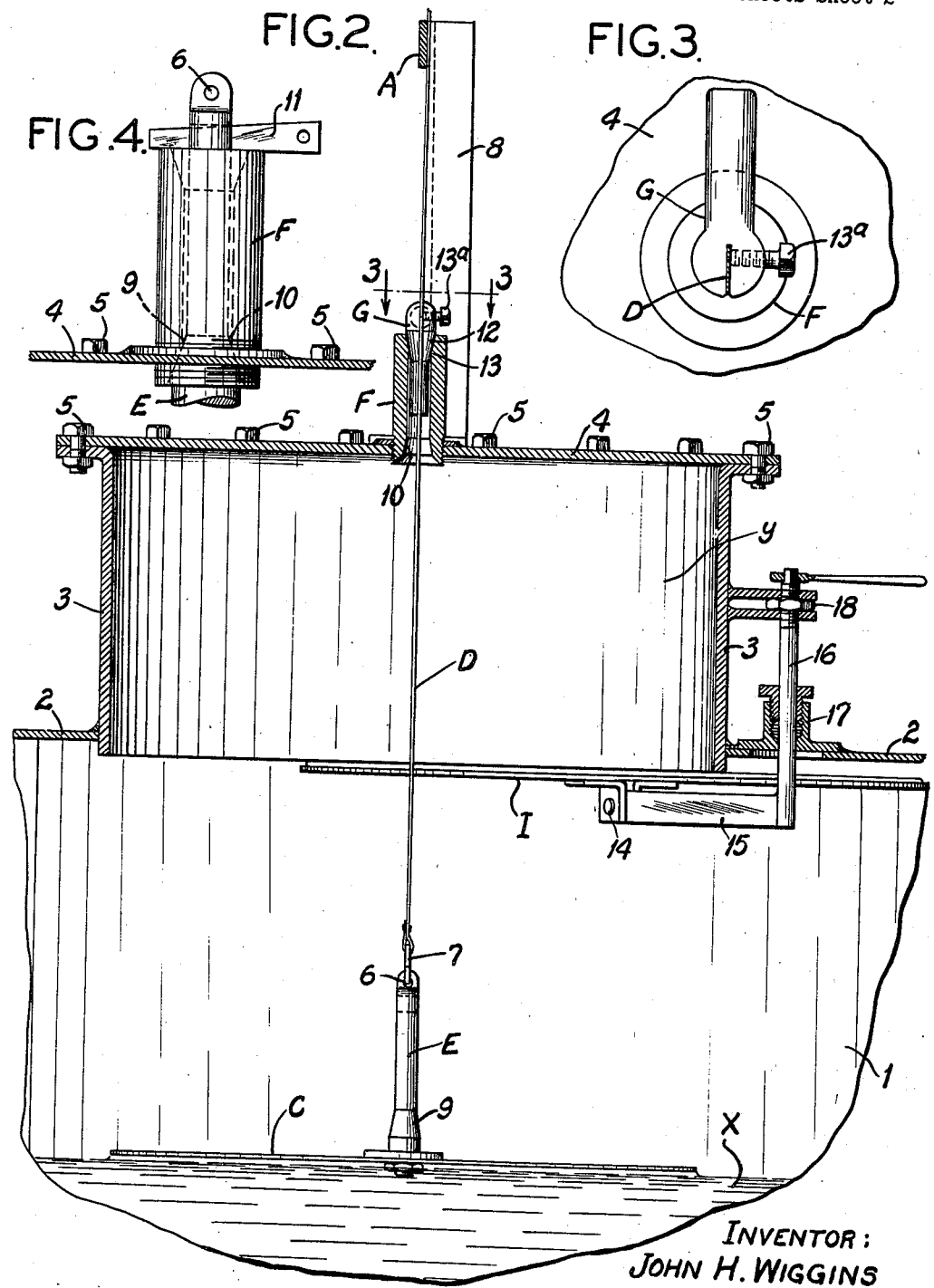

May 12, 1942.  J. H. WIGGINS  2,282,771
APPARATUS FOR GAUGING LIQUID CONTAINERS
Filed Nov. 28, 1938  3 Sheets-Sheet 3
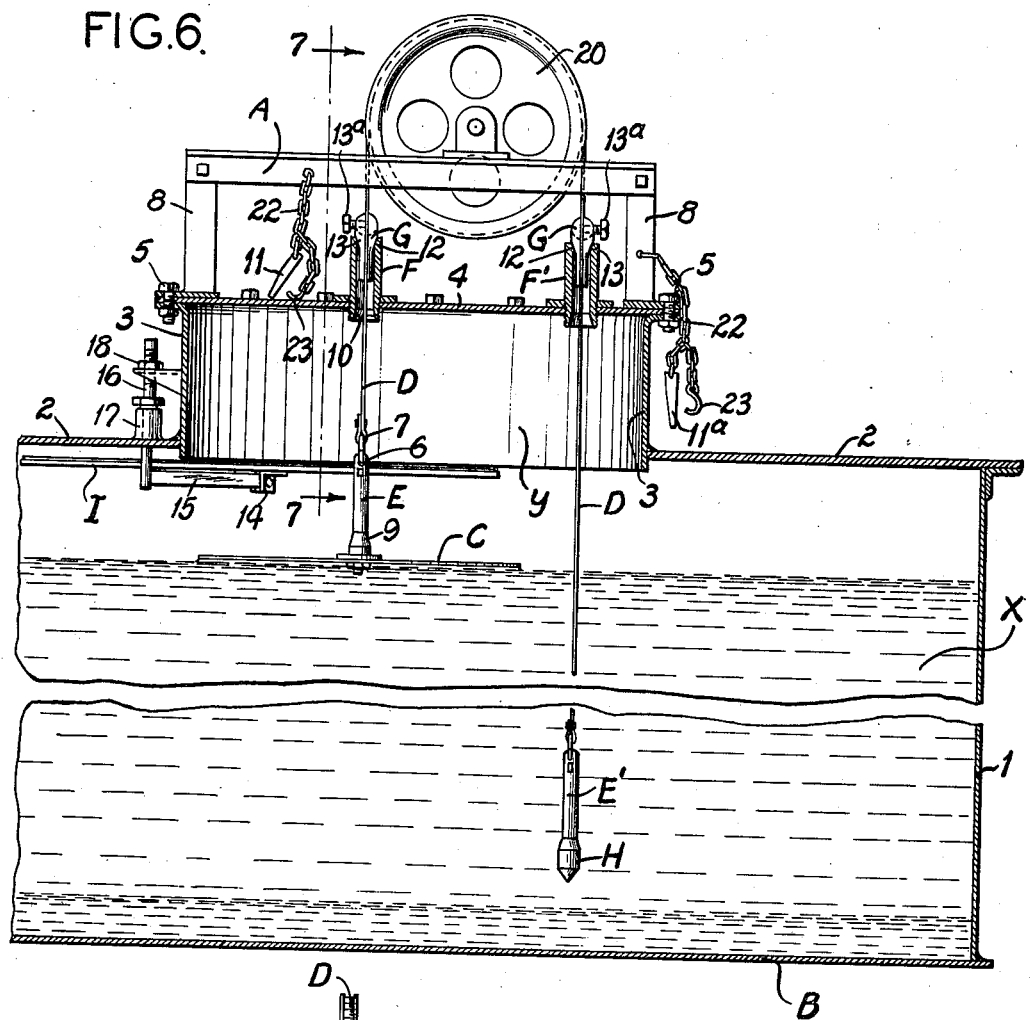
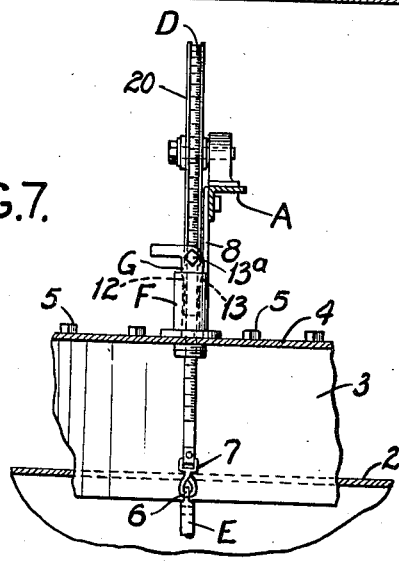
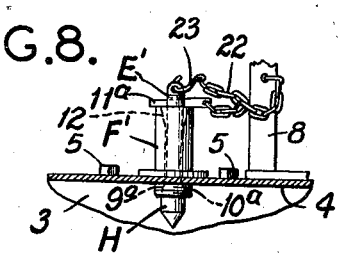
INVENTOR:
JOHN H. WIGGINS
BY Wells R. Church
ATTORNEY Patented May 12, 1942

2,282,771

UNITED STATES PATENT OFFICE 2,282,771

APPARATUS FOR GAUGING LIQUID CONTAINERS

John H. Wiggins, Chicago, Ill.

Application November 28, 1938, Serial No. 242,690

4 Claims. (Cl. 33—126.5)

This invention relates to devices and apparatus of the kind that are used to "gauge" or determine the depth of a body of liquid confined in a container.

One object of my invention is to provide a gauging apparatus that is accurate and reliable, easy to operate, and capable of being used successfully with the various types and kinds of containers now employed to store oil and other liquids, such as open containers, closed containers, and pressure containers, that are equipped with a breather type roof, a balloon type roof, or an equivalent movable part whose position is apt to change, due to a variation in the internal pressure of the container.

Another object is to provide a gauging apparatus for liquid containers, which is of such design or construction that the part or parts of the apparatus that have to be read or examined during the gauging operation, are located on the exterior of the container, and are not required to be encased in a housing equipped with glass covered openings, as is the custom with many kinds of gauging apparatus now in use.

Another object is to provide an apparatus of simple design, by which liquid confined in a pressure type container can be gauged accurately and quickly, without exposing the contents of the container to the atmosphere, and without liability of a substantial quantity of gas escaping from the container during the gauging operation; and Another object is to provide a reliable apparatus for gauging liquid confined in a container, that comprises a flexible measuring element adapted to be arranged between the liquid and a datum point located outside of the container, and means for automatically setting the measuring element in correct reading position, thereby overcoming the necessity of relying upon the sense of touch of the user to set or accurately position the measuring element.

Another object is to provide a novel means for engaging liquid confined in a container.

Other objects and desirable features of my invention will be hereinafter pointed out.

Figure 1 of the drawings is a vertical sectional view, illustrating my improved gauging apparatus, installed on a closed container provided with a rigid or immovable roof.

Figure 1ᵃ is a fragmentary side elevational view, illustrating a slight modification of the apparatus shown in Figure 1.

Figure 2 is an enlarged vertical sectional view of the apparatus shown in Figure 1, taken on the line 2—2 of Figure 1.

Figure 3 is a horizontal sectional view, taken on the line 3—3 of Figure 2.

Figure 4 is a fragmentary side elevational view, on an enlarged scale, of the means that is used to normally seal the opening in the container through which the measuring element travels when the apparatus is being used to gauge the container.

Figure 5 is a side elevational view, illustrating my apparatus applied to a container equipped with a flexible roof or bodily removable roof, which may either be of the breather type or of the balloon type.

Figure 6 is a vertical sectional view, illustrating another form of my invention, which is of slightly different construction from that shown in Figure 1.

Figure 7 is a sectional view, taken on the line 7—7 of Figure 6; and

Figure 8 is a detail view, illustrating the means that I prefer to use to eliminate the possibility of the telltale or the plumb bob dropping accidentally into the container, through carelessness on the part of the user, when one or the other of said parts is being connected to or disconnected from the measuring element.

In the drawings, I designates a container, such, for example, as a metal tank of the kind now used extensively for storing gasoline and other volatile liquids $x$, 2 designates a gas-tight roof at the upper end of the container, 3 designates a manhole or upwardly-projecting collar on said roof that forms the side wall of a receiving chamber $y$ in which some of the parts of my improved apparatus are positioned when the apparatus is not in use, and 4 designates a removable cover for the chamber $y$ that is normally clamped tightly by fastening devices 5 to a flange at the upper end of the collar 3.

In using my improved gauging apparatus the depth of the body of liquid in the container I is determined by subtracting a number representing the distance between the surface of the liquid $x$, and a datum point A from a second number representing the distance between said datum point and the bottom B of the container. The method of procedure by which the distance between the surface of the liquid and said elevated datum point is measured, is novel, and the means employed to practice or carry out said method is also novel. Briefly described, said method involves arranging a measuring element vertically between the datum point A and the liquid $x$, and anchoring or temporarily attaching the lower end of said measuring element to the surface of the liquid at the time the measurement is taken. The means that is used to practice or carry out said method may be constructed in various ways, without departing from the spirit of my invention. One gauging apparatus that I have found to be suitable for practicing my method above referred to comprises a device, herein referred to, for convenience, as a "telltale" C attached to the lower end of any suitable measuring element D, and constructed so that if said measuring element is given an upward pull at a time when the telltale C is located at approximately the surface of the liquid $x$, the surface tension of the liquid or the adhesion of the liquid to said telltale will exert an opposing force or counteracting force on the measuring element of such intensity as to notify the user (by the sense of touch or by the "feel" of the measuring element) that said measuring element is set or adjusted in proper relationship with the datum point A to show or indicate the true distance between said datum point and the surface of the liquid. The telltale C is formed by a relatively light-weight, plate-like member of considerable area attached to the lower end of the measuring element D in such a manner that said member C is capable of assuming a horizontal position, parallel with the surface of the liquid, when the measuring element is pulled upwardly. The telltale C may be of such specific gravity and of such construction that it will float upon the liquid, but it is preferably designed so as to be capable of sinking in or being submerged in the liquid. The measuring element D is provided with units of measurement that can be read easily by the user, and said measuring element preferably consists of a conventional flexible metal measuring tape.

In the form of my invention shown in Figures 1, 2, 3 and 4 the telltale C consists of a disk-shaped member constructed of aluminum or some other suitable relatively lightweight material, and having a diameter of approximately 20 inches. I have obtained good results with a telltale of 19½ inches in diameter, made of aluminum, and having a thickness of about $\frac{1}{16}$ of an inch. Said disk-shaped member should be substantially flat, and the measuring element should be attached to same in such a way that the lifting force will be in a vertical line at the geometrical center of the telltale. Any substantially thin, light-weight, flat member will be suitable for the telltale of my improved apparatus, but a disk-shaped member offers the best mechanical results. The total hanging weight of said device should be light, compared to the adhesive pull of the surface tension of the liquid on same.

A stem or spindle E that projects upwardly from the top side of the telltale C, is provided at its upper end with a hole or eye 6 that is adapted to receive a hook, snap, or other suitable attaching device 7 on the lower end of the measuring tape D, which measuring tape leads upwardly through a guide F on the removable cover 4 of the chamber $y$. The datum point A, which may consist of a perfectly level, horizontally-disposed bar carried by uprights 8 on the cover 4, is arranged in vertical alignment with the longitudinal axis of the tape guide F, so as to insure that the tape will be disposed in a truly vertical position, when said tape is held against one side of the datum bar A, in the operation of gauging the container. Normally, when the gauging apparatus is not in use, the spindle E on the telltale C is positioned in the tape guide F, and the hole or eye 6, in the upper end of said spindle, that receives the attaching device 7 on the tape, is positioned above the upper end of the tape guide F, thereby permitting the measuring tape to be easily connected to or detached from the telltale. At such times, i. e., when the gauging apparatus is not in use, the chamber $y$ is sealed and gases are prevented from escaping through the tape guide F, by means of a tapered portion 9 on the spindle E that bears against a tapered surface or seat 10 on the interior of the guide F. Various means may be used to hold the co-acting surfaces 9 and 10 on said spindle and guide in tight engagement with each other, the means herein illustrated for that purpose consisting of a removable wedge 11, that is adapted to be positioned in a slot in the upper end portion of the spindle E, and then driven home, so as to co-act with the upper end of the guide F, and with the top wall of the slot in the spindle E, to exert an upward pull on the spindle to seat it tightly in the guide F. When the apparatus is being used to gauge the container, the hole or opening in the guide F that normally receives the spindle E is blocked up or filled by a removable stopper G provided with a tapered portion 12 that fits snugly in a tapered hole or seat 13 on the interior of the guide F, said stopper having a vertically-disposed slot in the same that forms a passageway through which the tape D can travel, without liability of a substantial quantity of gas escaping from the container through said slot. In order that the stopper G may be easily combined with and disassociated from the tape D, the slot in said stopper that receives the tape is open at both ends, and one of the side edges of said slot terminates in the exterior of the stopper, thereby enabling the stopper to be slipped sidewise over the tape D, preparatory to positioning said stopper in the guide F. A set screw 13$a$ that is mounted in the stopper G, as shown in Figures 2 and 3, is used to temporarily connect the measuring tape D to the stopper, as hereinafter described.

A gauging apparatus constructed in accordance with my invention may consist simply of the parts above described, provided the container on which the apparatus is used is of such construction that there is never any variation in the distance between the datum point A and the bottom of the container. In gauging or computing the depth of the liquid in such a container, the user knows the distance between the datum point A and the bottom of the container, and accordingly, it is only necessary for the user to measure the distance between the datum point and the surface of the liquid by means of the tape D and telltale C, and then subtract the number representing that distance from the known number, which represents the distance between the bottom of the container and the elevated datum point A. However, for the sake of accuracy and in order to facilitate the use of the apparatus on any closed container whose bottom or whose top might change its position, I prefer to equip the apparatus with a plumb bob H that can be used in conjunction with a measuring element to measure the distance between the bottom of the container and the datum point A at each gauging operation. Said plumb bob may be permanently attached to a measuring element separate and distinct from the measuring element used to operate the telltale C, or the same measuring element may be used to operate both the telltale C and the plumb bob H. In the form of my invention herein illustrated the plumb bob H is normally mounted in a separate tape guide F" carried by the cover 4 of the chamber y, and constructed so that after the tape D and the telltale C have been used to measure the distance between the surface of the liquid and the datum point A, said measuring element can be disconnected from the telltale and then attached to the plumb bob H and operated to measure the distance between the datum point A and the bottom B of the container 1. The plumb bob H is provided with a shank or spindle E' of similar construction to the shank or spindle of the telltale C, and the guide F" in which the spindle of the plumb bob is normally positioned is constructed so that after a retaining wedge 11a has been inserted in a slot in the upper end portion of the plumb bob spindle E', gases cannot escape from the container through the guide F". In order that the parts of the gauging apparatus may be inspected, repaired or removed from the container 1, without exposing the contents of the container to the atmosphere, and without reducing the pressure in the container, or permitting gases to escape from same. I prefer to equip the container with an auxiliary closure I that can be moved into a position to seal the lower end of the chamber y and cut off communication between the chamber and the interior of the container 1. As shown in the drawings, the auxiliary closure I is arranged inside of the container 1 in such a way that while it is normally positioned at one side of the sleeve 3 on the top wall 2 of the container, it can be swung laterally into alignment with said sleeve and seated against the lower end of same, so as to cut off communication between the interior of the container 1 and the chamber y. The particular construction and arrangement of the auxiliary closure 1 forms no part of my present invention, but in the apparatus herein illustrated said closure is pivotally connected at 14 to one or more arms 15 that project laterally from the lower end of an oscillating, vertically-disposed shaft 16 carried by a gas-tight bearing 17 on the roof 2 of the container 1. To arrange said auxiliary closure I in its operative position, the shaft 16 is turned so as to swing said closure into alignment with the lower end of the sleeve 3, and thereafter a threaded device 18 on the shaft 16 is manipulated so as to force the closure I into gas-tight engagement with the lower end of the sleeve I. Normally, the auxiliary closure I is positioned so as to not obstruct or interfere with the movement of the telltale C and plumb bob H into and out of the container 1.

In using the apparatus above described to gauge the container 1, the measuring tape D is first attached to the upper end of the spindle E on the telltale C, and the stopper G is slipped over the tape, and the set screw 13a is tightened, so as to temporarily attach the stopper to the tape, preferably at a point in close proximity to the attaching device 7 on the lower end of the tape. The wedge 11 is then withdrawn from the slot in the spindle of the telltale C, thus permitting the tape to be lowered through the guide F, the downward movement of the tape causing the stopper G to be positioned in the upper end of the guide F before the spindle E of the telltale leaves the guide, with the result that gases are effectively prevented from escaping from the container through the guide F. The user then loosens the set screw 13a, so as to release the tape from the stopper G, which, at this time, is positioned in the guide F. Thereafter, the user permits the tape to continue to move downwardly rapidly until the telltale C strikes the surface of the liquid. The user can tell by the sense of touch when the telltale strikes the surface of the liquid, and he then pays out three or four inches more of the measuring tape and waits for the telltale to sink below the surface of the liquid, and come to rest with a gentle jerk on the tape. In sinking below the surface of the liquid, the telltale tips or assumes an angular position, partly due to the unbalancing effect produced on the disk-shaped portion of the telltale by the upwardly-projecting spindle E thereon, with the result that any air which may have become trapped on the underside of the telltale, will spill out or escape from underneath the telltale. It is now known that the telltale is about three or four inches below the surface of the liquid, and thereafter the user pulls the tape upwardly slowly, until there is a sudden great increase in the pull, or until a change in the tension on the tape is noticed. The telltale is now right at the surface of the liquid and is held there by surface tension, or by the adhesion of the liquid to the telltale. At this point in the operation the user notes the number or character on the tape that is in alignment with the datum point A, which number represents the distance between the datum point and the surface of the liquid. As the upward pull on the tape is steadily increased, there is practically no upward movement of the telltale, until the upward force is great enough to break the surface tension. When the surface tension is broken, the tape, in the hand of the user, jerks upwardly slightly, thus notifying the user that the theoretical end of the tape was positioned in touching contact with the surface of the liquid at the time the observation or reading of the tape was made. To check the accuracy of the measuring operation, the user may repeat the operation of submerging the telltale in the liquid, and then drawing the telltale upwardly out of the liquid, being careful to read the tape each time the upward movement of the tape is arrested by the counteracting force of pressure that is exerted on the tape by the surface tension of the liquid. If the telltale assembly weighs two pounds and the telltale is 19½ inches in diameter, the total pull required to break the surface tension is about six to seven pounds, which is an increase of over 200% of the dead weight. Consequently, the user can easily tell by the sense of touch or by the feel of the tape, when the tape is positioned properly, so as to indicate or show the exact distance between the surface of the liquid and the datum point A.

After the distance between the datum point A and the surface of the liquid has been ascertained, the user disconnects the tape D from the telltale C and attaches said tape to the upper end of the spindle E' of the plumb bob H. A stopper G is also slipped over the tape, just above the fastening device 7, and temporarily secured to the tape by tightening the set screw 13a. The wedge 11a is then removed from the upper end of the spindle of the plumb bob, so as to permit the tape to be lowered through the guide E' until the stopper seats firmly in the seat provided for same in the upper portion of the guide E'. Thereafter, the set screw 13a is loosened so as to free the tape from the stopper and the tape is lowered into the container until the plumb bob comes into contact with the bottom of the container. It is possible for the user to tell, by the sense of touch, when the end of the plumb bob is in touching contact with the bottom of the container, and after the tape has been adjusted to attain this result, the user glances at the tape, so as to note the graduation or number on the tape that is then in alignment with the datum point A, and which represents the distance between the datum point and the bottom of the container. Thereafter, the number representing the distance between the datum point and the surface of the liquid is subtracted from the number representing the distance between the datum point and the bottom of the container, so as to ascertain the depth of the liquid in the container. At the completion of the gauging operation, the plumb bob H is restored to its normal position in the guide F'', and locked therein by inserting the wedge 11a in the upper end portion of the plumb bob spindle. The plumb bob and telltale are now both positioned in the chamber y, and the openings in the cover or top wall 4 of said chamber through which the measuring element was lowered into the container are both effectively sealed. All of the various operations previously described are performed by a workman located on the roof of the container, and as the measuring element and datum point are not encased in housings provided with glass covered sight openings, there is little liability of the operator making a mistake in reading the measuring element. If it is desired to inspect, remove or replace the telltale, plumb bob, or other parts located on the interior of the chamber y, this can be done without danger of gases escaping from the container 1, simply by moving the auxiliary closure I into operative position to cut off communication between the container and the chamber y, after which the cover of said chamber can be removed with perfect safety.

When the apparatus is used on a container provided with a breather type roof or balloon type roof 2a that rises and falls as the internal pressure of the container varies, it is preferable to mount the datum point A' of the apparatus on a supporting structure 19 carried by the stationary side wall of the container, as shown in Figure 5.

In the apparatus previously described the user depends upon his sense of touch, or on the "feel" of the measuring element or tape to determine when said measuring element is set in correct reading position. However, if desired, the apparatus may comprise or can be equipped with a means that is used to automatically set the measuring element in correct reading position, or to arrest the upward movement of the measuring element relatively to the liquid, after the measuring element has reached such a position that its end, or theoretical end, is in just touching contact with the surface of the liquid. Figure 1a of the drawings illustrates one type of tank gauging apparatus embodying this principle of operation, or equipped with a means of the character referred to. In said apparatus the measuring element or tape D has attached to one end of same, a telltale C, or other suitable device, constructed so as to utilize the action of the liquid on said device to temporarily attach said device to the liquid, or to hold the measuring element taut when it is being read, and a means 21 is provided for exerting an upward pull on the measuring element in excess of the total suspended weight, and causing it to automatically stop or come to rest when said measuring element reaches correct reading position, the expression "total suspended weight," as herein used, meaning the weight of the telltale C, plus all its attachments, plus the suspended portion of the measuring element itself. Thus, there is a net "pull" on the liquid itself. The above mentioned means 21 is illustrated in Figure 1a as consisting of a weight that the user can combine with or attach to the measuring element D, and said measuring element and weight are arranged so that during the operation of measuring the distance between the datum point and the surface of the liquid, the weight 21 constitutes or functions as a counterweighting mechanism that exerts pressure on the measuring element in a direction to pull the telltale C upwardly through the liquid to the surface of the liquid, whereupon the measuring element will come to rest with its end, or theoretical end, arranged at the surface of the liquid, or, in other words, when the theoretical end of the measuring element (assuming that the telltale C constitutes the terminal end of the measuring element) is in touching contact with surface of the liquid. As shown in Figure 1a, the measuring element leads upwardly from the liquid over or around a guide or rotatable member, which may consist of a pulley, sheave, or wheel 20, and the counterweighting means 21 is so constructed that it can be detachably connected to or adjustably combined with the measuring element. The pulley 20 is herein illustrated as being mounted on the horizontally-disposed bar that constitutes the datum point A, and the measuring tape D leads upwardly from the guide F, then over the pulley 20, and thence downwardly from said pulley, as shown in Figure 1a. The weight 21 is attached to the tape at a point below the axis of the pulley, and only need be heavy enough to overbalance the telltale assembly plus the weight of the tape. In the gauging operation the user lowers the tape and telltale into the container, as previously explained in describing the apparatus shown in Figure 1, and after the telltale has been submerged in the liquid or positioned just below the surface of the liquid, the user releases the tape. Thereafter, the weight 21 comes into action and exerts a slight upward pull on the tape. The telltale will rise through the liquid, and when said telltale comes to the surface of the liquid, it will stop automatically, due to the fact that the weight 21 is not heavy enough to overcome the surface tension of the liquid, or the adhesive pull of the liquid on the telltale plus the weight of the telltale and tape. When the tape stops or ceases to move, the user reads the tape, because at this time the tape is set in proper reading position with relation to the liquid, the lower end of the tape being anchored or temporarily attached to the surface of the liquid by the telltale C. Obviously, the weight 21 must be designed or proportioned so that although it will slightly overbalance the telltale assembly plus the weight of the tape it will not be of sufficient weight to overbalance the telltale assembly and tape, plus the downward pull exerted on the telltale by the surface tension of the liquid when the telltale tries to move upwardly away from the surface of the liquid. For example, if the telltale assembly weighs 2 lbs., the counterweight should weigh about 4 lbs., and thus give a 2 lb. pull on the meniscus of the liquid and leave a margin of 1 to 2 lbs. before the meniscus would break. I wish it to be understood that when my improved gauging apparatus is equipped with a counterweighting means for automatically setting or for assisting the user to set the measuring element in correct reading position, said counterweighting means can be constructed in various ways and can be combined with the measuring element in various ways, without departing from the spirit of my invention.

In Figures 6 and 7 of the drawings I have illustrated a gauging apparatus, in which a telltale and plumb bob of similar construction to those used in the apparatus shown in Figure 1 are attached to the opposite ends of a measuring tape D that travels over an elevated pulley 20, arranged like the tape pulley of the apparatus shown in Figure 1ᵃ. In such an apparatus the plumb bob H that co-operates with the tape in the operation of measuring the distance between the datum point A and the bottom of the container performs the function of a counterweighting means for the measuring element, during the operation of measuring the distance between the datum point and the surface of the liquid, i. e., it moves the tape in a direction to raise the telltale C through the liquid, after the user has submerged the telltale, and causes the tape to stop automatically when the telltale reaches the surface of the liquid and tries to move upwardly away from the surface of the liquid. Automatic setting of the measuring element during the operation of measuring the distance between the datum point and the bottom of the tank, can also be attained in instances where it is desired not to rely upon the sense of touch of the user, by employing a counterweighting means combined with the measuring element in such a way that when the measuring element is manipulated to lower the plumb bob into the liquid, said counterweighting means comes into operation to hold the measuring element taut with the plumb bob positioned in touching contact with the bottom of the tank. In the apparatus shown in Figures 6 and 7, the telltale C acts or functions as a counterweighting means for the measuring element to set the measuring element accurately in correct reading position in the operation of measuring the distance between the datum point and the bottom of the tank, and the plumb bob functions or acts as a counterweighting means to hold the telltale C in its inactive position, above the surface of the liquid, when said telltale is not in use. During the operation of measuring the distance between the datum point and the bottom of the tank, the plumb bob H, which is heavier than the telltale assembly C, will sink to the bottom of the tank, and the measuring element D will be held taut, or at the right tension, due to the counterweighting or counterbalancing effect of the telltale assembly, said telltale assembly and plumb bob being of such relative weights that when the plumb bob moves into touching contact with the tank bottom, the movement of the measuring element will cease automatically and stop in correct reading position for measuring the distance between the datum point and the bottom of the tank. Obviously, various other types and kinds of counterweighting means could be employed to set, or assist in setting, of the measuring element in correct reading position during the operation of measuring the distances between the datum point and the bottom of the tank, and to set, or assist in the setting, of the measuring element in correct reading position, during the operation of measuring the distances between the datum point and the surface of the liquid.

In order to eliminate the possibility of the telltale or plumb bob dropping accidentally into the container when either one of said devices is being attached to or disconnected from the measuring tape, each of the wedges 11 and 11ᵃ is secured to a stationary part of the apparatus by a chain 22 provided with a hook 23 that is adapted to be engaged with the eye of the spindle with which the wedge co-operates before the measuring tape is attached to or disconnected from said spindle. Thus, as shown in Figure 8, the wedge 11ᵃ that is positioned in the spindle E′ of the plumb bob H is attached to a chain 22 provided with a hook 23 that is positioned in the eye or hole in the upper end of the spindle E′, when the plumb bob is not in use. If, in the act of attaching the measuring tape to said plumb bob, the user should thoughtlessly remove the wedge 11ᵃ before the tape is attached to the spindle of the plumb bob, the chain 22 would prevent the plumb bob from dropping downwardly into the container 1. It will, of course, be understood that after the tape has been attached to the spindle of the plumb bob, the hook 23 on the chain 22 is disengaged from the plumb bob spindle, so as to permit the plumb bob to be lowered into the container, as previously explained.

A gauging apparatus of the construction above described is easy to operate, as the parts of same which have to be observed during the gauging operation are all arranged out in the open. Such an apparatus is accurate and reliable, as the user can tell definitely when the measuring tape is in absolutely correct measuring position, and the apparatus has the added advantage of comprising only a relatively few parts of simple design that are not liable to get out of order, and which can be easily installed on any of the various types and kinds of containers now used for storing gasoline and other large bodies of liquid.

In the apparatus herein illustrated the datum point A is located above the surface of the liquid, but I wish it to be understood that my invention contemplates locating the datum point in various other positions. For example, instead of locating the datum point above the liquid and supporting said datum point from a part carried by the roof of the container, the datum point could be located at or near the ground, on the exterior of the container, thereby making it possible for a person to gauge the liquid without climbing onto the roof of the container. Obviously, if the datum point were arranged in this manner, it would be necessary to construct and arrange the tape or measuring element so that it would lead upwardly from the telltale, over the upper edge of the side wall of the container, and thence, downwardly to the datum point.

Having thus described my invention, what I claim as new and desire to secure by Letters Patent is:

1. The combination of a gas-tight liquid container, a gauging device inside of said container, a tape for actuating said gauging device, a guide on the container through which said tape travels or passes, a removable stopper in said guide provided with a slot in which said tape travels when the gauging device is being used, and a portion on the gauging device that is adapted to enter said guide and seal same when said gauging device is not in use.

2. An apparatus for gauging liquid confined in a container, comprising a datum point located on the exterior of the container, a flexible measuring element provided at its lower end with a device that is adapted to be submerged in the liquid and then drawn upwardly to the surface of the liquid by upward movement imparted to said measuring element, an overhead device over which said measuring element leads, and a counterweighting means adapted to co-act with said measuring element and with the submergible device at the lower end of same to automatically set said measuring element in correct reading position when the device at the lower end of said measuring element is in touching contact with the surface of the liquid.

3. An apparatus for gauging liquid confined in a container, comprising a flexible measuring element that leads upwardly from the liquid, an elevated rotatable device over and around which the measuring element passes, a datum point outside of the liquid with which the measuring element co-acts, and members at the opposite ends of said measuring element adapted to be used in the operations of measuring the distance between the datum point and the surface of the liquid and measuring the distance between the datum point and the bottom of the container, and constructed so as to automatically effect correct setting of the measuring element in making said measurements.

4. An apparatus for gauging liquid confined in a container, comprising a light-weight, plate-like member, a flexible measuring element for submerging said member in the liquid and then drawing said member upwardly to the surface of the liquid, said member and measuring element being so constructed and combined that the plate-like member will tilt, thus releasing air on the underside of same, during the downward movement of said member through the liquid, and will assume a horizontal position when said member is pulled upwardly through the liquid, the measuring element being adapted to be subjected to an upward pull in an amount or degree greater than the total weight of said plate-like member, plus the weight of said measuring element, until said plate-like member becomes practically stationary, due to the adhesion of the liquid thereon, and a datum point that co-operates with said measuring element to indicate the distance, in units of measurement, between said datum point and the surface of the liquid, said apparatus also including a second submergible device of greater weight than said plate-like member, combined with said measuring element in such a way that when said second device is permitted to sink to the bottom of the container in the operation of measuring the distance between said bottom and said datum point, the plate-like member will function as a counterweight to hold the measuring element under the correct tension when said second device touches the bottom of the container in the operation of measuring the distance between said bottom and said datum point.

JOHN H. WIGGINS.